June 24, 1924.
A. B. DAVIS
1,498,683
TIRE REPAIR MEANS
Filed Oct. 30, 1923
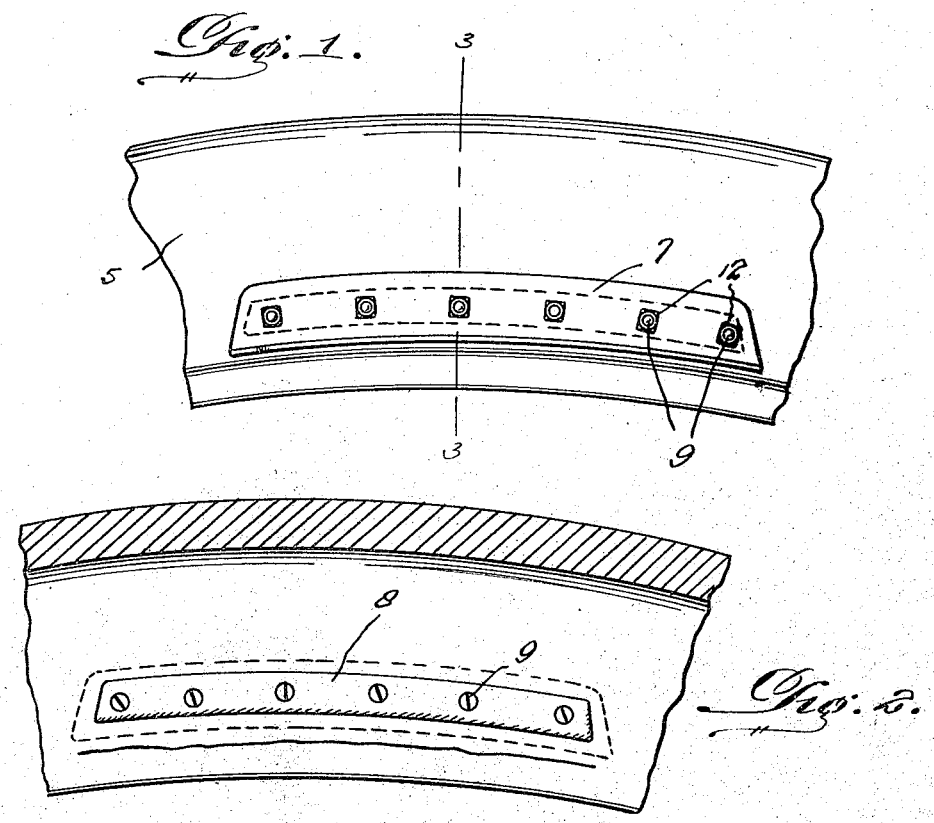
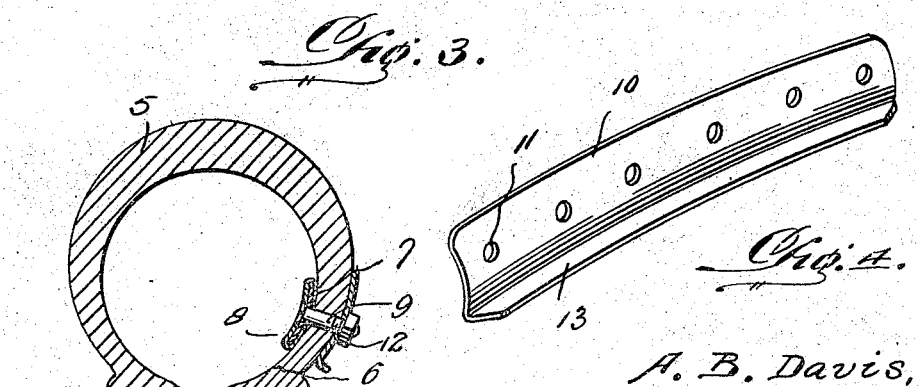

Patented June 24, 1924.

1,498,683

UNITED STATES PATENT OFFICE.

ALBERT B. DAVIS, OF SMITHFIELD, VIRGINIA.

TIRE-REPAIR MEANS.

Application filed October 30, 1923. Serial No. 671,719.

*To all whom it may concern:*

Be it known that I, ALBERT B. DAVIS, a citizen of the United States, residing at Smithfield, in the county of Isle of Wight and State of Virginia, have invented certain new and useful Improvements in Tire-Repair Means, of which the following is a specification.

This invention has reference to a means for repairing tires and particularly to a means whereby rim cuts of the shoes of pneumatic tires may be repaired in such a manner as to enable the tires to be used as originally intended without necessitating the same being discarded or stitched to another tire after the beads thereof have been removed as is now the case.

The primary object of my invention resides in the provision of a means whereby rim cuts of pneumatic tire shoes may be repaired that is extremely simple of construction and one that may be employed by those unskilled in the art.

With the above and other objects in view as the nature of the invention is better understood, the same comprises the novel form, combination and arrangement of parts set forth in the following specification, shown in the accompanying drawing and claimed.

In the drawing, wherein like reference characters indicate corresponding parts throughout the several views, Figure 1 is a fragmentary side elevational view of a rim cut tire repaired by my novel means, Figure 2 is a longitudinal section through this tire for more clearly disclosing the inner element of this repair means, Figure 3 is a vertical section taken substantially upon the line 3—3 of Figure 1, and Figure 4 is a perspective view of one of the elements comprised in this novel tire repair means.

Now having particular reference to the drawing wherein there is shown the most practical embodiment of my invention, 5 designates an ordinary shoe of a pneumatic tire that has been rim cut as at 6.

My invention per se embodies the provision of a relatively elongated slightly arcuate-shaped and concavo-convex metal plate 7 that is embedded in rubber 8 which plate is adapted to be positioned upon the interior of the shoe 5 and at a point directly above said rim cut 6, the purpose of the rubber coating being to prevent chafing of the inner tube after the same has been placed therein and inflated.

This metal plate 7 is formed longitudinally with spaced openings through which are extended headed and screw-threaded bolts 9, it being obvious that the adjacent side wall of the shoe 5 must necessarily be provided with openings preferably by punching the same therethrough for receiving these bolts. After the metal plate 7 has been properly positioned within the tire and the bolts 9 extended through the openings in the adjacent side wall thereof an additional relatively elongated slightly arcuate-shaped concavo-convex metal plate 10 which is slightly wider and longer than the before mentioned plate 7 is placed into close contact with the outer side of this wall of the shoe 5 formed with spaced openings 11 for receiving the screw-threaded ends of the before mentioned bolts 9 whereby the nuts 12 may be screwed upon these bolts for compressing the plates 7 and 9 upon the opposite surfaces of the wall of said shoe 5.

The lower edge of the last mentioned plate 10 is formed with an outwardly and upwardly extending flange 13 that terminates directly above the outer edge of the adjacent tire bead as shown in Figure 3 whereby when the tire is placed upon the rim the adjacent flange thereof will engage over this flange 13 for consequently preventing any further cutting of the wall of the tire.

In view of the above description when considered in conjunction with the accompanying drawing, numerous advantages of a tire repair means of this nature will be appreciated by those skilled in the art, and even though I have herein set forth the most practical embodiment of the invention with which I am at the present time familiar, it is nevertheless to be understood that minor changes may be made within the invention, without departing from the spirit and scope of the appended claim.

Having thus described my invention, what

I claim as new and desire to secure by Letters Patent, is:—

A device for closing the rim cut incisions in a pneumatic tire casing comprising an inner plate of relatively rigid material encased in an envelope of rubber, said plate being curved transversely, an outer plate of relatively rigid material curved transversely and provided along one of its longitudinal edges only with an outstanding flange and bolts passing transversely through both of said plates.

In testimony whereof I affix my signature.

ALBERT B. DAVIS.